US011313586B2

(12) United States Patent
Kim

(10) Patent No.: US 11,313,586 B2
(45) Date of Patent: Apr. 26, 2022

(54) HEAT EXCHANGER

(71) Applicant: Kyungdong Navien Co., Ltd., Gyeonggi-Do (KR)

(72) Inventor: Young Mo Kim, Gyeonggi-do (KR)

(73) Assignee: Kyungdong Navien Co., Ltd., Gyeonggi-Do (KR)

(*) Notice: Subject to any disclaimer, the term of this patent is extended or adjusted under 35 U.S.C. 154(b) by 759 days.

(21) Appl. No.: 15/258,064

(22) Filed: Sep. 7, 2016

(65) Prior Publication Data

US 2016/0377319 A1 Dec. 29, 2016

Related U.S. Application Data

(63) Continuation of application No. PCT/KR2015/002456, filed on Mar. 13, 2015.

(30) Foreign Application Priority Data

Mar. 18, 2014 (KR) .................. 10-2014-0031442

(51) Int. Cl.
| | |
|---|---|
| *F24H 1/16* | (2022.01) |
| *F24H 8/00* | (2022.01) |
| *F24H 1/30* | (2022.01) |
| *F28F 3/04* | (2006.01) |
| *F28D 9/00* | (2006.01) |
| *F24H 1/38* | (2022.01) |
| *F28D 21/00* | (2006.01) |

(52) U.S. Cl.
CPC ............ *F24H 1/165* (2013.01); *F24H 1/30* (2013.01); *F24H 1/38* (2013.01); *F24H 8/00* (2013.01); *F28D 9/0012* (2013.01); *F28D 9/0043* (2013.01); *F28F 3/044* (2013.01); *F28D 2021/0024* (2013.01); *Y02B 30/00* (2013.01)

(58) Field of Classification Search
CPC ... F24H 1/165; F24H 1/30; F24H 1/38; F24H 8/00; F24D 9/0043; F28D 2021/0024; F28F 4/044; Y02B 30/102
USPC ........................................ 122/18.31
See application file for complete search history.

(56) References Cited

U.S. PATENT DOCUMENTS 7,302,916 B2* 12/2007 LeMer .................. F24H 1/43
122/15.1
8,978,638 B2* 3/2015 Le Mer ................. F23D 14/62
126/193

FOREIGN PATENT DOCUMENTS

| JP | 2006-214628 A | 8/2006 |
|---|---|---|
| KR | 10-2010-0087620 A | 8/2010 |
| KR | 10-2011-0084726 A | 7/2011 |
| KR | 10-2012-0045249 A | 5/2012 |
| KR | 20120045249 A * | 5/2012 |
| KR | 10-2013-0052912 A | 5/2013 |

(Continued)

*Primary Examiner* — Steven B McAllister
*Assistant Examiner* — Benjamin W Johnson
(74) *Attorney, Agent, or Firm* — Mintz Levin Cohn Ferris Glovsky and Popeo, P.C.; Joohee Lee

(57) ABSTRACT

The present invention relates to a heat exchanger comprising: a burner for combusting a mixture of air and fuel; and a heat exchange unit in which heat is exchanged between combustion gas caused by the combustion of the burner and a heating medium, wherein the heat exchange unit includes a plurality of unit plates stacked on each other, and a sensible-heat exchange unit and a latent-heat exchange unit coaxially disposed around the burner are integrally formed with the unit plates.

14 Claims, 18 Drawing Sheets

(56) References Cited

FOREIGN PATENT DOCUMENTS

WO     2002050480 A1    6/2002
WO     2005080900 A2    9/2005

\* cited by examiner

HEAT EXCHANGER

CROSS-REFERENCE TO RELATED APPLICATIONS

This application is a continuation application of International Application No. PCT/KR2015/002456 filed on Mar. 13, 2015, which claims priority to Korean Application No. 10-2014-0031442 filed on Mar. 18, 2014. The applications are incorporated herein by reference.

TECHNICAL FIELD

The present disclosure relates to a heat exchanger provided in a boiler for heating or hot water, and more particularly, to a heat exchanger having a simplified structure and also improving heat transfer efficiency between a heating medium and combustion gas by stacking a unit plate manufactured in a constant pattern to integrally form a sensible-heat exchange unit and a latent-heat exchange unit which are arranged at the circumference of a burner in a coaxial structure.

BACKGROUND ART

A boiler for heating or hot water is a device for applying heat to heating water or direct water (hereinafter, referred to as a 'heating medium') by a heat source to heat a desired zone or supply hot water, and is configured to include a burner for burning a mixture of gas and air, and a heat exchanger for transferring combustion heat of combustion gas to the heating medium.

A boiler produced in the early days employed a heat exchanger of heating a heating medium using only sensible heat generated upon combustion of a burner, whereas a boiler produced recently is a condensing boiler designed to improve thermal efficiency, which is provided with a sensible heat exchanger for absorbing sensible heat of combustion gas generated in a combustion chamber and a latent heat exchanger for absorbing latent heat generated upon condensation of water vapor that is contained in the combustion gas undergone heat exchange in the sensible heat exchanger. Such a condensing boiler is commercialized in an oil boiler as well as a gas boiler to thereby contribute much to an increase of boiler efficiency and fuel expenses reduction.

As described above, a conventional heat exchanger of a condensing type configured with a sensible heat exchanger and a latent heat exchanger has a structure in which an air blower, a fuel supply nozzle, and a burner are typically installed at an upper part of a housing, and the sensible heat exchanger and the latent heat exchanger, in which heat exchange fins are coupled to an outside of a heat exchange pipe, are sequentially installed inside the housing below the burner.

However, such a heat exchanger of a condensing type has a problem in that a dimension of the heat exchanger should be increased due to the structure in which the air blower is located at the upper part of the housing and the sensible heat exchanger and the latent heat exchanger are longitudinally located inside the housing.

As the prior art for addressing such a problem, minimizing the dimension and improving heat exchange efficiency, a heat exchanger is disclosed in Korean Registered Patent Nos. 10-1321708, 10-0581578, and 10-0813807, wherein the heat exchanger is configured with a burner located at a center thereof and a heat exchange pipe wound on a circumference of the burner in a coil shape.

FIG. 1 shows a cross-sectional view of a heat exchanger of a condensing boiler disclosed in Korean Registered Patent No. 10-0813807. A heat exchanger 40 shown in FIG. 1 is configured to include a burner 10 installed to discharge downward combustion gas, a heat exchange pipe 20 wound on a circumference of the burner 10 in a coil shape so as to heat water supplied inside the heat exchanger 40 to a desired temperature by heat generated at the burner 10 to thereby provide the heated water as heating water or hot water, and a partition wall 30 installed at a lower side of the heat exchange pipe 20 in a horizontal direction to form a passage of combustion gas. As shown in FIG. 1, the heat exchange pipe 20 is arranged to have an inclined surface 21 that is inclined from an outside of a body to an inside thereof by a predetermined angle to be directed to a central direction of the burner 10, and one end of a connecting pipe 33 is connected to and installed at a body of the partition wall 30, which forms a communication hole 32 thereinside, thereby connecting one side of the heat exchange pipe 20 to the other side thereof through the other end of the connecting pipe 33.

However, the heat exchanger disclosed in the prior art documents has a disadvantage in which a torsional phenomenon occurs while the heat exchange pipe is helically processed to cause a difficulty in processing an entire surface of the heat exchange pipe in a uniform shape.

Also, when a heat exchange pipe has undergone a bending process, damage may occur upon the bending process due to a difference of a strain rate between an inside surface of the heat exchange pipe toward a center of a burner and an outside surface thereof opposite the inside surface, and thus the heat exchange pipe exchanging heat with combustion gas may have a limitation to be formed in a wider width. As a result, there is a structural limitation in which a sufficient area for processing a irregular shape promoting a turbulent flow on a surface of a heat exchange pipe is not secured as a configuration for more improving heat transfer efficiency between a heating medium and combustion gas.

In addition, the conventional heat exchanger has problems in that an installation structure of the heat exchanger is complicated because a housing H is separately provided as a configuration for tightly sealing an outer circumference of the heat exchange pipe 20 being helically wound, and a heat source of combustion gas is not fully transferred to a heating medium flowing inside the heat exchange pipe 20 because heat transferred to the housing H is directly radiated and dissipated to an outside thereof, wherein the heat is transferred to the housing H while the combustion gas generated by combustion of the burner 10 passes a longitudinally separated space of the heat exchange pipe 20 to flow through a space between the heat exchange pipe 20 and an inner wall of the housing H.

Additionally, the conventional heat exchanger has problems in that heat generated by the combustion of the burner 10 is transferred to a plate 11 for fixing the burner 10 to thereby cause an overheating, and also an insulating material or a heat dissipation fin at an outside of the plate 11 should be additionally provided in order to prevent such an overheating such that a complicated structure and a heat loss are induced.

SUMMARY

To address the above described problems, an object of the present disclosure is to provide a heat exchanger capable of reducing the number of components configuring the heat exchanger and simplifying a coupling structure by stacking a unit plate to integrally configure a sensible heat exchanger and a latent heat exchanger, and also integrally configuring a heating medium passage, a combustion gas passage, and an outer wall structure sealing outer lateral surfaces of the heating medium passage and the combustion gas passage.

Another object of the present disclosure is to provide a heat exchanger capable of securing a large heat transfer area between a heating medium and combustion gas by forming a flow channel of the heating medium to be long at maximum in a restricted space, and also maximizing thermal efficiency by promoting generation of a turbulent flow in the flow of the heating medium and the combustion gas.

Still another object of the present disclosure is to provide a heat exchanger capable of more improving thermal efficiency by collecting combustion heat of combustion gas into a heating medium at maximum, wherein the combustion gas is discharged through a discharge passage of the combustion gas.

To realize the above described objects, a heat exchanger of the present disclosure includes a burner 200 configured to burn a mixture of air and fuel, and a heat exchange unit 300 configured to exchange heat between combustion gas generated by combustion of the burner 200 and a heating medium, wherein the heat exchange unit 300 is configured by stacking a plurality of unit plates, and a sensible-heat exchange unit 300-1 and a latent-heat exchange unit 300-2 are arranged at a circumference of the burner 200 in a coaxial structure to be integrally formed at the plurality of unit plates being stacked.

A first heating medium passage P1 and a first combustion gas passage P2 are separately and alternately formed to be adjacent to each other at the sensible-heat exchange unit 300-1, a second heating medium passage P3 and a second combustion gas passage P4 are separately and alternately formed to be adjacent to each other at the latent-heat exchange unit 300-2, and a combustion gas discharge passage P5 is formed at an edge of each of the plurality of unit plates to discharge combustion gas passed the first combustion gas passage P2 and the second combustion gas passage P4.

Each of the plurality of unit plates may be configured with a first plate and a second plate which are longitudinally stacked, the first plate may include a first plane portion A1 in which a first through hole B1 is formed at a central part thereof, a first flange portion C1 formed to extend from an edge of the first plane portion A1 to an upper side thereof to be bended to an outward side thereof, and a first passage forming protruding portion D1 and a second passage forming protruding portion D3 formed to be spaced apart from each other to an inward side and an outward side at a region between the edge of the first plane portion A1 and the first through hole B1 and having an upwardly convex shape, and the second plate may include a second plane portion A2 in which a second through hole B2 of a shape corresponding to that of the first through hole B1 and having an upper surface coming into tight contact with a bottom surface of the first plane portion A1, a second flange portion C2 formed to extend from an edge of the second plane portion A2 to a lower side thereof to be bended to an outward side and coupled to a first flange portion C1 of a unit plate being located below the second plate, and a first passage forming depressed portion D2 and a second passage forming depressed portion D4 arranged to be spaced apart from each other to an inward side and an outward side at a region between the edge of the second plane portion A2 and the second through hole B2 and formed to be concave downward, wherein the first passage forming depressed portion D2 may form the first heating medium passage P1 between the first passage forming protruding portion D1 and the first passage forming depressed portion D2, and the second passage forming depressed portion D4 may form the second heating medium passage P3 between the passage forming protruding portion D3 and the second passage forming depressed portion D4.

The first flange portion C1 may be formed to be higher than a protruding height of each of the first passage forming protruding portion D1 and the second passage forming protruding portion D3, the second flange portion C2 may be formed to be deeper than a depressed depth of each of the first passage forming depressed portion D2 and the second passage forming depressed portion D4, and thus a longitudinally separated space may be provided between a lower end of a first passage forming depressed portion D2 of a unit plate being located at an upper side among unit plates being longitudinally located to be adjacent to each other, and an upper end of a first passage forming protruding portion D1 of a unit plate being located at a lower side thereamong, thereby forming the first combustion gas passage P2, and a longitudinally separated space may be provided between a lower end of a second passage forming depressed portion D4 of the unit plate being located at the upper side, and an upper end of a second passage forming protruding portion D3 of the unit plate being located at the lower side, thereby forming the second combustion gas passage P4.

A plurality of first gap maintaining protruding portions E1 may be formed to protrude at the same height as that of the first flange portion C1 at the first passage forming protruding portion D1, a plurality of second gap maintaining protruding portions E3 may be formed to protrude at the same height as that of the first flange portion C1 at the second passage forming protruding portion D3, a plurality of first gap maintaining depressed portions E2 may be formed to be depressed at the same depth as that of the second flange portion C2 at the first passage forming depressed portion D2, and a plurality of second gap maintaining depressed portions E4 may be formed to be depressed at the same depth as that of the second flange portion C2 at the second passage forming depressed portion D4.

A first combustion gas outlet F1 may be formed at the edge of the first plane portion A1 to provide the combustion gas discharge passage P5, and a second combustion gas outlet F2 may be formed at a position on the edge of the second plane portion A2, wherein the position longitudinally may correspond to the first combustion gas outlet F1, and thus combustion gas, which passed the first combustion gas passage P2 and the second combustion gas passage P4, may sequentially pass the first combustion gas outlet F1 and the second combustion gas outlet F2 which are formed at each of the plurality of unit plates being longitudinally stacked, thereby being discharged.

A turbulent flow forming portion G having an irregular shape on a surface thereof may be formed at the first passage forming protruding portion D1, the first passage forming depressed portion D2, the second passage forming protruding portion D3, and the second passage forming depressed portion D4, wherein a protruding upper end and a depressed lower end of the turbulent flow forming portion G may be formed to come into contact with each other inside the first heating medium passage P1 and the second heating medium passage P3. As one embodiment, the first passage forming protruding portion D1 may be formed to be entirely communicated along a circumferential direction of the first plate, the first passage forming depressed portion D2 may be formed to be entirely communicated along a circumferential direction of the second plate, and a through hole may be formed at the first gap maintaining protruding portion E1 and the first gap maintaining depressed portion E2 so as to connect a first heating medium passage P1 of the unit plate being located at the upper side to that of the unit plate being located at the lower side, wherein the through hole may be located to reverse a direction of the first heating medium passage P1 in the unit plate being located at the upper side against that of the first heating medium passage P1 in the unit plate being located at the lower side.

In this case, a heating medium, which flowed in through a through hole formed at one side of a first plate configuring a unit plate being located at an upper side among unit plates that are longitudinally located to be adjacent to each other, may be branched off to both directions to flow along the first heating medium passage P1, and then may pass a through hole formed at a second plate being located at an opposite side against the first plate and a through hole formed at a first plate configuring a unit plate being located at a lower side, thereby flowing in a first heating medium passage P1 of the unit plate being located at the lower side.

As another embodiment, the first passage forming protruding portion D1 may be formed to be partially communicated along a circumferential direction of the first plate, the first passage forming depressed portion D2 may be formed to be partially communicated along a circumferential direction of the second plate, and a through hole may be formed at the first gap maintaining protruding portion E1 and the first gap maintaining depressed portion E2 so as to connect a first heating medium passage P1 of the unit plate being located at the upper side to that of the unit plate being located at the lower side, wherein the through hole may be located so as to reverse a direction of the first heating medium passage P1 in the unit plate being located at the upper side against that of the first heating medium passage P1 of the unit plate being located at the lower side.

A heating medium, which flowed in through a through hole formed at one side of a first plate configuring a unit plate located at an upper side among unit plates being longitudinally located to be adjacent to each other, may flow in one direction along the first heating medium passage P1, and then may pass a through hole formed at a second plate being located at an opposite side against the first plate and a through hole formed at a first plate configuring a unit plate being located at a lower side thereamong, thereby flowing in a first heating medium passage P1 of the unit plate being located at the lower side.

In the above described embodiments, multiple first heating medium passages P1 may be configured in parallel with each other by stacking the unit plate.

A heating medium inflow pipe 410 may be connected to a lower part of the latent-heat exchange unit 300-2, wherein a heating medium may flow in the second heating medium passage P3, a passage connecting portion E may be provided at an upper part of each of the latent-heat exchange unit 300-2 and the sensible-heat exchange unit 300-1 and may be communicated with an upper part of the second heating medium passage P3 and an upper part of the first heating medium passage P1, thereby guiding a heating medium passed the second heating medium passage P3 to flow in the first heating medium passage P1, and a heating medium discharge pipe 420 may be connected to a lower part of the sensible-heat exchange unit 300-1 to discharge the heating medium passed the first heating medium passage P1.

An upper duct 100 may be provided at an upper part of the heat exchange unit 300, wherein combustion gas, which is passing the combustion gas discharge passage P5 to flow upward, may be discharged through the upper duct 100, and a lower duct 400 may be provided at a lower part of the heat exchange unit 300, wherein a condensed water guide portion 401 may be formed at the lower duct 400 to guide condensed water of water vapor, which is contained in the combustion gas passing the combustion gas discharge passage P5, to a condensed water discharge pipe.

The unit plate may be arranged to surround the circumference of the burner 200 in a polygonal shape, a circular shape, or an oval shape.

A heating medium connecting passage P may be formed at a lateral circumferential surface of an upper part of the burner 200, wherein the heating medium connecting passage P may be connected to a first heating medium passage P1 located at the upper part of the burner 200, thereby allowing the heating medium to pass the heating medium connecting passage P.

In accordance with the heat exchanger of the present disclosure, the number of components of the heat exchanger may be reduced and a structure thereof may be simplified by integrally forming a sensible-heat exchange unit and a latent-heat exchange unit which are arranged to surround a burner in a coaxial structure inside unit plates being stacked in a multiple stage, and also configuring a heating medium passage, a combustion gas passage, and a combustion gas discharge passage together therewith.

Also, a heat transfer area between a heating medium and combustion gas may be secured to be large by forming a heating medium passage to alternately change a flow channel through which the heating medium flows inside unit plates being stacked in a multiple stage to provide the flow channel of the heating medium to be long at maximum in a restricted space, and also thermal efficiency may be maximized by promoting generation of a turbulent flow in the flow of the heating medium and the combustion gas.

In addition, a plurality of unit plates are multiply stacked to configure multiple heating medium passages in parallel with each other such that a pressure loss may be minimized, a separate connection component may not be needed, and a part for connecting the heating medium passages to each other may be used as a heat exchange area.

Additionally, deformation of a unit plate due to a pressure of a heating medium may be prevented and pressure resistance performance of the unit plate may be improved by contacting and welding a shape for forming a turbulent flow to an inside of each of a heating medium passage and a combustion gas passage.

Further, a heating medium passage and a combustion gas passage are configured to connect to a unit plate, respectively, so that heat exchange may be performed through an entire unit plate, thereby more improving thermal efficiency.

Moreover, a passage through which a heating medium passes may be formed at a lateral surface of an upper part of a burner, thereby preventing a burner support plate form being overheated and more improving thermal efficiency.

Furthermore, heat insulation efficiency between a sensible-heat exchange unit and a latent-heat exchange unit may be increased by allowing a heating medium to pass a space between plates configuring a heat isolator that is located between the sensible-heat exchange unit and the latent-heat exchange unit.

DETAILED DESCRIPTION

Figure 1:
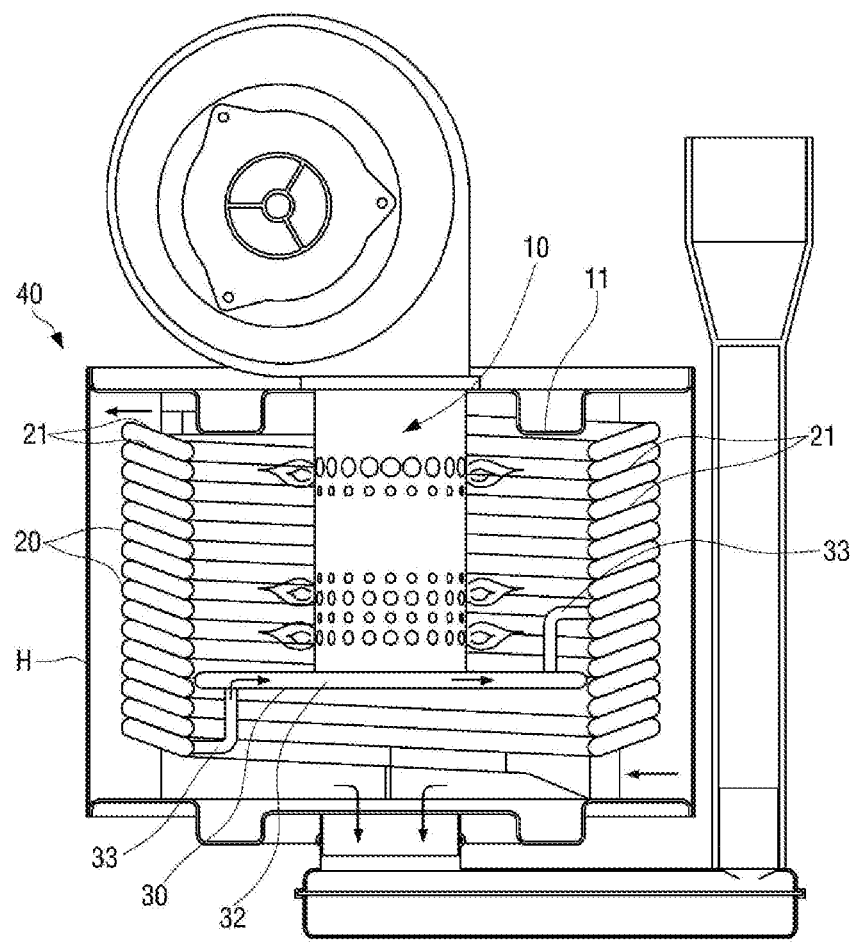
FIG. 1 is a cross-sectional view of a heat exchanger in which a heat exchange pipe is helically installed at a circumference of a conventional burner.
Figure 2:
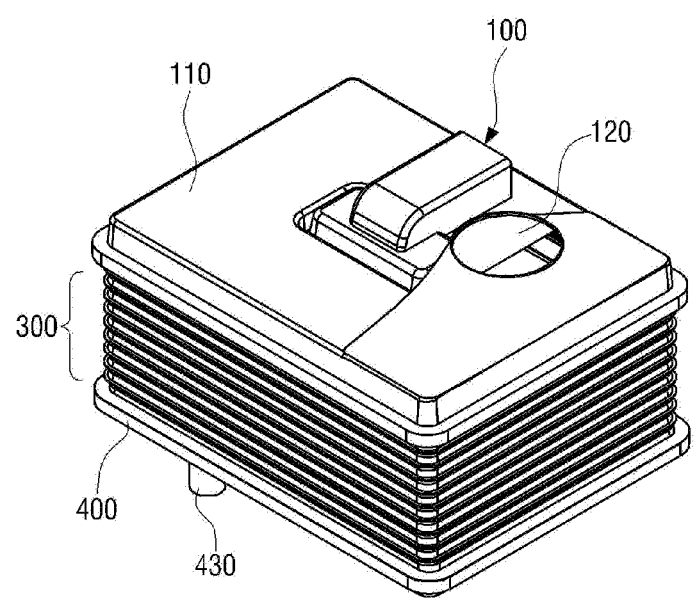
FIGS. 2 and 3 are perspective views of a heat exchanger according to one embodiment of the present disclosure when viewed from upper and lower sides, respectively.
Figure 3:
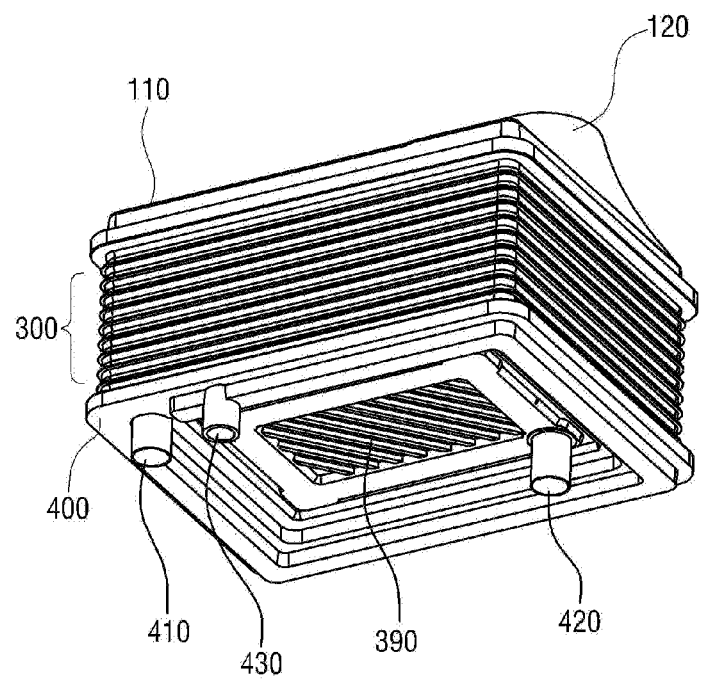

Hereinafter, a configuration and an action with respect to a preferred embodiment of the present disclosure will be described in detail as follows with reference to the accompanying drawings.

With reference to FIGS. 2 to 5, a heat exchanger according to the present disclosure includes an upper duct 100 at which a mixture inflow unit 110 and a flue 120 are formed, wherein a mixture of air and fuel flows in the mixture inflow unit 110 and the flue 120 discharges combustion gas; a burner 200 for burning the mixture flowing therein through the mixture inflow unit 110; a heat exchange unit 300 provided at a circumference of the burner 200 to exchange heat between combustion gas generated by combustion of the burner 200 and a heating medium and configured with a plurality of unit plates 310, 320, 330, 340, 350, 360, 370, 380, 390, and 390-1 which are longitudinally stacked; and a lower duct 400 coupled to a lower part of the heat exchange unit 300.

The mixture inflow unit 110 is configured to include a mixture inflow pipe 111 and a support panel 112 supporting the burner 200 and blocking a leakage of combustion gas.

The burner 200 burns a mixture of air and fuel flowing therein through the mixture inflow unit 110 to generate combustion gas of high temperature. The burner 200 is configured to be fixed to the support panel 112 to generate flame in a downward direction.

Figure 7:
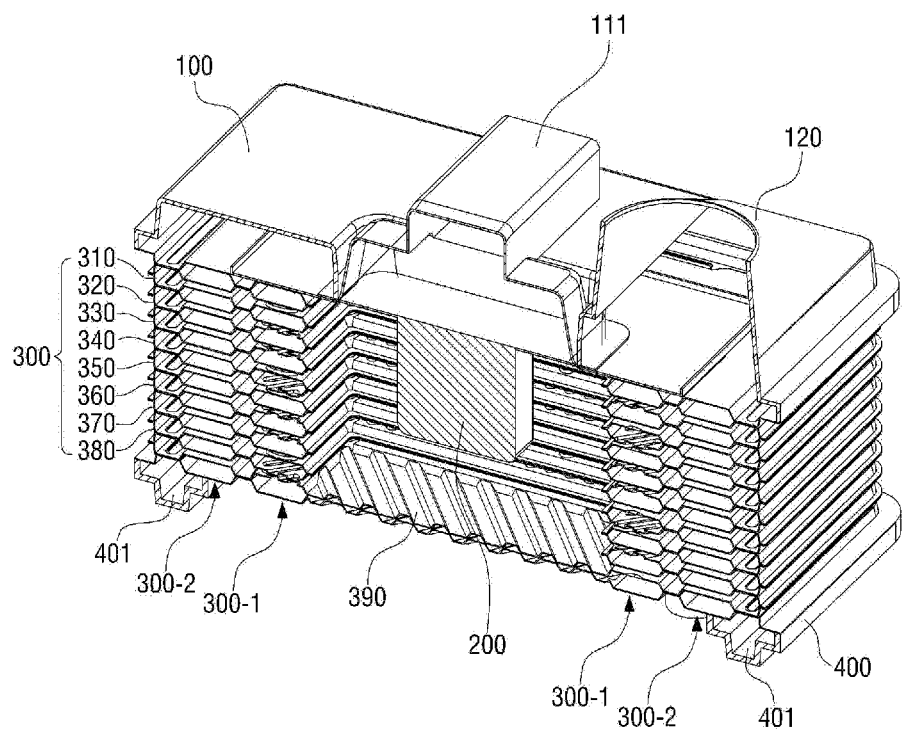
FIG. 7 is a perspective view taken along line A-A of FIG. 5.
Figure 8:
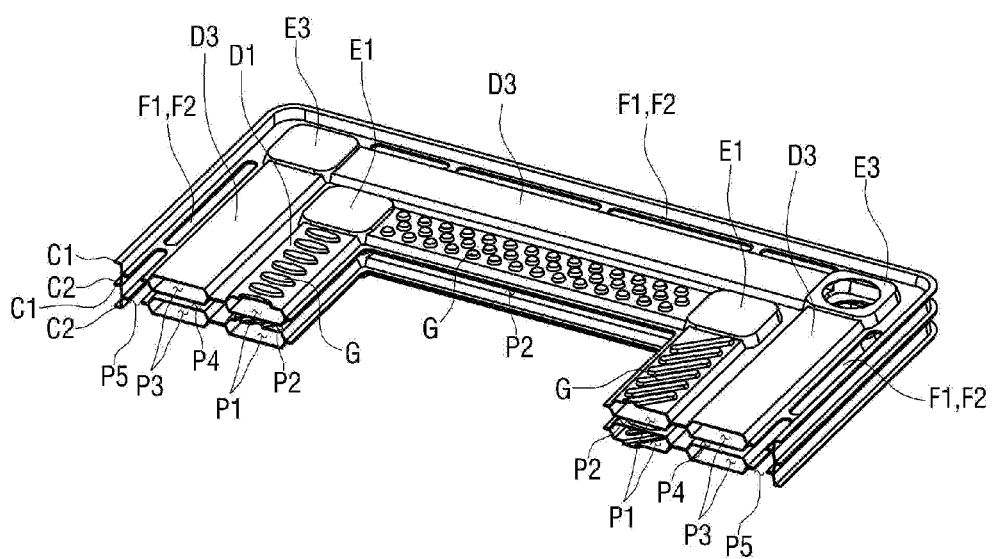
FIG. 8 is a dissected perspective view of a part of a unit plate.
Figure 9:
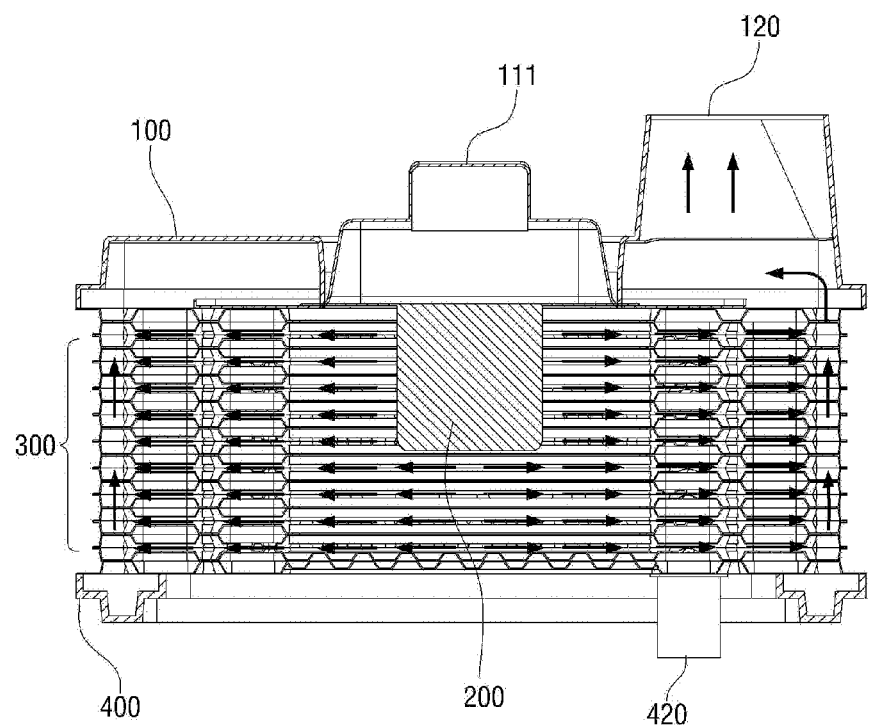
FIG. 9 is a cross-sectional view taken along line A-A of FIG. 5.
Figure 10:
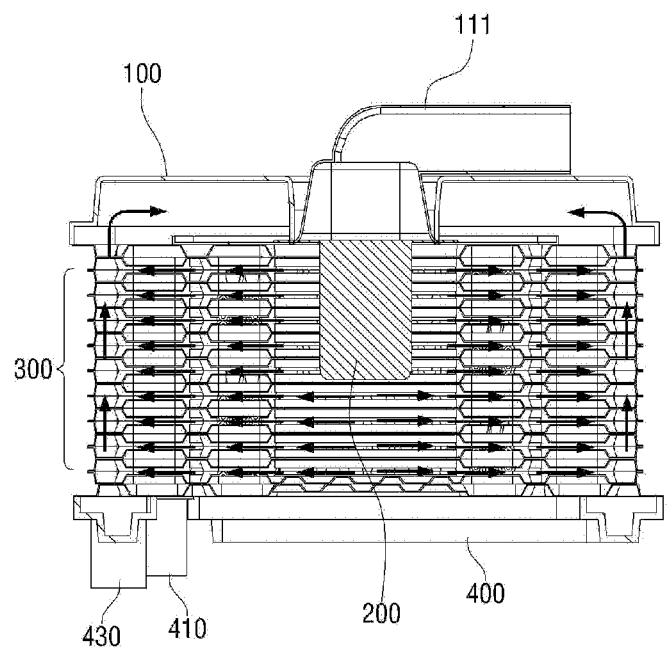
FIG. 10 is a cross-sectional view taken along line B-B of FIG. 5.
Figure 11:
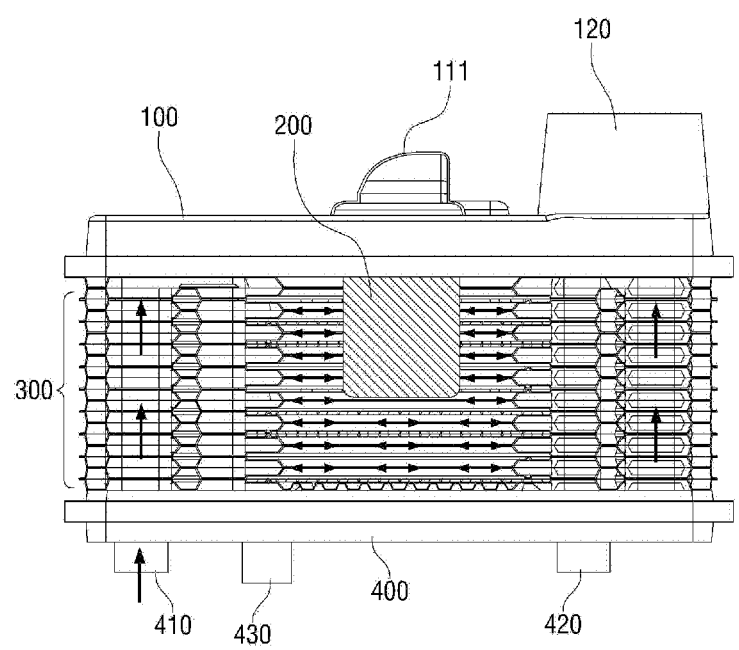
FIG. 11 is a cross-sectional view taken along line C-C of FIG. 6.

As shown in FIG. 7, the heat exchange unit 300 is configured with a sensible-heat exchange unit 300-1 for absorbing sensible heat of combustion gas generated by combustion of the burner 200, and a latent-heat exchange unit 300-2 for absorbing latent heat generated while water vapor contained in combustion gas, which has undergone heat exchange at the sensible-heat exchange unit 300-1, is condensed. According to the present disclosure, the sensible-heat exchange unit 300-1 and the latent-heat exchange unit 300-2, which have a coaxial structure centering on the burner 200, are integrally configured at the unit plates 310, 320, 330, 340, 350, 360, 370, 380, 390, and 390-1 which are stacked in a multiple stage.

In other words, the sensible-heat exchange unit 300-1 is located at an inside of each of the unit plates 310, 320, 330, 340, 350, 360, 370, 380, 390, and 390-1, and the latent-heat exchange unit 300-2 is integrally formed at a position spaced apart from the sensible-heat exchange unit 300-1 to an outward side thereof.

The lower duct 400 is connected to a heating medium inflow pipe 410 through which a heating medium flows in the latent-heat exchange unit 300-2, and a condensed water discharge pipe 430 discharging condensed water from which water vapor contained in combustion gas passing the latent-heat exchange unit 300-2 is condensed to fall.

Also, the lower duct 400 includes a condensed water guide portion 401 of a depressed shape for guiding falling condensed water to flow toward the condensed water discharge pipe 430, and a flange portion 402 formed at an outer circumference of the condensed water guide portion 401 and coupled to a flange portion C2 that is formed at a unit plate 390a being located at a lower-most position.

Hereinafter, a configuration and an action of each of the sensible-heat exchange unit 300-1 and the latent-heat exchange unit 300-2 configuring the heat exchange unit 300, which are a characteristic configuration of the present disclosure, will be described.

The present disclosure is characterized in that the sensible-heat exchange unit 300-1 and the latent-heat exchange unit 300-2 are integrally formed at a plurality of unit plates 310, 320, 330, 340, 350, 360, 370, 380, 390, and 390-1 configuring the heat exchange unit 300 and being longitudinally stacked, and also heating medium passages P1 and P3, combustion gas passages P2 and P4 and a combustion gas discharge passage P5 are formed together at the plurality of unit plates 310, 320, 330, 340, 350, 360, 370, 380, 390, and 390-1.

With reference to FIGS. 4, 7, 8, and 13, the heat exchange unit 300 is configured with the plurality of unit plates 310, 320, 330, 340, 350, 360, 370, 380, 390, and 390-1 being longitudinally stacked and having a similar pattern to each other.

The unit plates 310, 320, 330, 340, 350, 360, 370, 380, 390, and 390-1 are configured with first plates 310a, 320a, 330a, 340a, 350a, 360a, 370a, 380a, 390a, and 390a-1 (hereinafter, referred to as a 'first plate') which are located at upper parts of the unit plates 310, 320, 330, 340, 350, 360, 370, 380, 390, and 390-1, and second plates 310b, 320b, 330b, 340b, 350b, 360b, 370b, 380b, 390b, and 390b-1 (hereinafter, referred to as a 'second plate') which are coupled to lower parts of the unit plates 310, 320, 330, 340, 350, 360, 370, 380, 390, and 390-1.

The first plate is configured to include a first plane portion A1 in which a first through hole B1 is formed at a central part thereof, a first flange portion C1 extending from an edge of the first plane portion A1 to an upper side thereof to be bended to an outward side thereof, and a first passage forming protruding portion D1 and a second passage forming protruding portion D3, which have an upwardly convex shape, arranged to be spaced apart to an inward side and an outward side at a region between the edge of the first plane portion A1 and the first through hole B1.

The second plate is configured to include a second plane portion A2 in which a second through hole B2 of a shape corresponding to that of the first through hole B1 is formed at a central part of the second plane portion A2, and having an upper surface coming into tight contact with a bottom surface of the plane portion A1; a second flange portion C2 extending from an edge of the second plane portion A2 to a lower side thereof to be bended to an outward side thereof and coupled to a first flange portion C1 of a unit plate being located below the second flange portion C2; and a first passage forming depressed portion D2 and a second passage forming depressed portion D4, which are formed in a downwardly concave shape, arranged to be spaced apart to an inward side and an outward side at a region between the edge of the second plane portion A2 and the second through hole B2, wherein the first passage forming depressed portion D2 forms a first heating medium passage P1 between the first passage forming protruding portion D1 and the first passage forming depressed portion D2, and the second passage forming depressed portion D4 forms a second heating medium passage P3 between the second passage forming protruding portion D3 and the second passage forming depressed portion D4.

The first flange portion C1 is formed to be higher than a protruding height of each of the first passage forming protruding portion D1 and the second passage forming protruding portion D3, and the second flange portion C2 is formed to be deeper than a depressed depth of each of the first passage forming depressed portion D2 and the second passage forming depressed portion D4.

Consequently, among unit plates being longitudinally stacked to be adjacent to each other, a longitudinally separated space is provided between a lower end of a first passage forming depressed portion D2 of a unit plate located at an upper side thereamong and an upper end of a first passage forming protruding portion D1 of a unit plate located at a lower side thereamong, thereby forming a first combustion gas passage P2, and a longitudinally separated space is provided between a lower end of a second passage forming depressed portion D4 of a unit plate located at an upper side thereamong and an upper end of a second passage forming protruding portion D3 of a unit plate located at a lower side thereamong, thereby forming a second combustion gas passage P4.

And, a plurality of first gap maintaining protruding portions E1, each of which protrudes at the same height as that of the first flange portion C1, are formed at the first passage forming protruding portion D1, a plurality of second gap maintaining protruding portions E3, each of which protrudes at the same height as that of the first flange portion C1, are formed at the second passage forming protruding portion D3, a plurality of first gap maintaining depressed portions E2, each of which is depressed at the same depth as that of the second flange portion C2, are formed at the first passage forming depressed portion D2, and a plurality of second gap maintaining depressed portions E4, each of which is depressed at the same depth as that of the second flange portion C2, are formed at the second passage forming depressed portion D4.

Therefore, among unit plates being longitudinally stacked to be adjacent to each other, a second flange portion C2 formed at a unit plate being located at an upper side thereamong is coupled to a first flange portion C1 formed at a unit plate being located at a lower side thereamong, a lower end of a first gap maintaining depressed portion E2 formed at the unit plate being located at the upper side comes into contact with an upper end of a first gap maintaining protruding portion E1 formed at the unit plate being located at the lower side, and a lower end of a second gap maintaining depressed portion E4 formed at the unit plate being located at the upper side comes into supporting contact with an upper end of a second gap maintaining protruding portion E3 formed at the unit plate being located at the lower side.

A first combustion gas outlet F1 is formed at the edge of the first plane portion A1 to provide the combustion gas discharge passage P5, and a second combustion gas outlet F2 is formed at a position, which longitudinally corresponds to the first combustion gas outlet F1, on the edge of the second plane portion A2, and thus combustion gas, which passed the first combustion gas passage P2 and the second combustion gas passage P4, sequentially passes the first combustion gas outlet F1 and the second combustion gas outlet F2 which are formed at each of the unit plates being longitudinally arranged, thereby being discharged.

As described above, because the second flange portion C2 of the upper side and the first flange portion C1 of the lower side are coupled to each other, the first gap maintaining depressed portion E2 and the second gap maintaining depressed portion E4 of the unit plate being located at the upper side come into supporting contact with the first gap maintaining protruding portion E1 and the second gap maintaining protruding portion E3 of the unit plate being located at the lower side, respectively, and the first combustion gas outlet F1 and the second combustion gas outlet F2, which are longitudinally communicated with each other, are formed at the edges of the first plate and the second plate, the first heating medium passage P1 and the first combustion gas passage P2 which configure the sensible-heat exchange unit 300-1, the second heating medium passage P3 and the second combustion gas passage P4 which configure the latent-heat exchange unit 300-2, and the combustion gas discharge passage P5, through which combustion gas passed the latent-heat exchange unit 300-2 is discharged toward the flue 120 of the upper duct 100, may be integrally formed and also bond strength may be improved.

Also, one among the passage forming protruding portions D1 and D3 and the passage forming depressed portions D2 and D4, or all of them may be configured to include a turbulent flow forming portion G of an irregular shape. The turbulent flow forming portion G may be configured in an outward protruding shape or an inward depressed shape on a surface of each of the passage forming protruding portions D1 and D3 and the passage forming depressed portions D2 and D4, and such a shape may be configured in a variety of shapes including an embossed shape, an oval shape, a rib shape inclined to one side, or the like. According to the configuration of the turbulent flow forming portion G, heat exchange efficiency may be improved by promoting generation of a turbulent flow in the flow of a heating medium passing each of the heating medium passages P1 and P3 and the flow of combustion gas passing each of the combustion gas passages P2 and P2.

Further, when the turbulent flow forming portion G is formed at the passage forming protruding portions D1 and D3 of the first plate in an downward depressed shape and at the passage forming depressed portions D2 and D4 of the second plate in an upward protruding shape, thereby being configured to contact a lower end of the downward depressed segment of the turbulent flow forming portion G to an upper end of the upward protruding segment thereof inside the heating medium passages P1 and P3, bond strength between the passage forming protruding portions D1 and D3 and the passage forming depressed portions D2 and D4 may be increased, thereby preventing the passage forming protruding portions D1 and D3 and the passage forming depressed portions D2 and D4 from being deformed and damaged due to pressure of the heating medium passing each of the heating medium passages P1 and P3.

In a helical heat exchange pipe structure according to the related art, deformation and damage problems of a pipe are caused by a bending process of the pipe so that there is a limitation to a structure in which it may be very difficult to secure a sufficient area on a surface of a heat exchange pipe so as to form an irregular shape promoting a turbulent flow thereon. On the other hand, according to the present disclosure, a heat exchanger is configured by stacking unit plates so that there is an advantage in which a space for forming the turbulent flow forming portion G may be secured to be large.

Hereinafter, flow channels of combustion gas and a heating medium in the heat exchanger according to the present disclosure will be described.

Firstly, a flow channel of combustion gas will be described.

With reference to FIGS. 5 and 7 to 9, a longitudinal flow of combustion gas generated by combustion of the burner 200 is blocked by the support panel 112 being located over the burner 200 and the unit plate 390-1 being located therebelow, and thus the combustion gas flows in a radially outward direction centering on the burner 200 to pass the first combustion gas passage P2 of the sensible-heat exchange unit 300-1 and the second combustion gas passage P4 of the latent-heat exchange unit 300-2. While passing the first and second combustion gas passages P2 and P4, the combustion gas transfers heat to a heating medium passing each of the first heating medium passage P1 of the sensible-heat exchange unit 300-1 and the second heating medium passage P3 of the latent-heat exchange unit 300-2.

In the course of passing the combustion gas passages P2 and P4, generation of a turbulent flow is concurrently promoted in the flow of the combustion gas and the heating medium by the turbulent flow forming portion G formed at each of the passage forming protruding portions D1 and D3 and the passage forming depressed portions D2 and D4 so that heat transfer efficiency between the combustion gas and the heating medium may be increased.

The combustion gas, which passed the second combustion gas passage P4, sequentially passes the combustion gas discharge passage P5 and moves upward to be discharged to an outside through the flue 120 provided at the upper duct 100, wherein the combustion gas discharge passage P5 is longitudinally communicated by the combustion gas outlets F1 and F2 formed at each of the unit plates 310, 320, 330, 340, 350, 360, 370, 380, 390, and 390-1 being longitudinally stacked.

At this point, while the combustion gas is passing the combustion gas discharge passage P5, heat transferred to an outer wall of the combustion gas discharge passage P5 is retransferred to the heating medium passing each of the heating medium passages P1 and P3 via the plane portions A1 and A2, the passage forming protruding portions D1 and D3, and the passage forming depressed portions D2 and D4 by a conducting method, and thus a heat loss may be minimized to more improve thermal efficiency.

A flow channel of a heating medium is configured such that the heating medium flows in the first heating medium passage P1 of the latent-heat exchange unit 300-2 through the heating medium inflow pipe 410 connected to a lower part of the latent-heat exchange unit 300-2 to move upward, and the heating medium moved to an upper side of the first heating medium passage P1 flows in an upper side of the second heating medium passage P3 of the sensible-heat exchange unit 300-1 to move downward, thereby being discharged through a heating medium discharge pipe 420 connected to a lower part of the sensible-heat exchange unit 300-1, wherein the second heating medium passage P3 is communicated through an inner space S of a passage connecting portion E formed at the first plate 310a of the unit plate 310 being located at an upper-most position.

With reference to FIGS. 6 and 11 to 13, a flow channel of a heating medium will be described.

Firstly, a flow channel of a heating medium of the latent-heat exchange unit 300-2 will be described.

In the unit plates 310, 320, 330, 340, 350, 360, 370, 380, 390, and 390-1, the second gap maintaining protruding portion E3 and the second gap maintaining depressed portion E4 are formed at four corners of each of the second passage forming protruding portion D3 and the second passage forming depressed portion D4, respectively, and through holes 311, 321, 322, 324, 325, 331, 332, 335, 336, 341, 342, 344, 345, 351, 352, 355, 356, 361, 362, 364, 365, 371, 372, 375, 376, 381, 382, 384, 385, 391, 392, 395, 396, 391a, 392a, 392b, and 391b, some of which longitudinally correspond to each other, are formed at the second gap maintaining protruding portion E3 and the second gap maintaining depressed portion E4 which are diagonally opposite to each other.

Consequently, a heating medium flowing in through the heating medium inflow pipe 410 flows in the second heating medium passage P3 through the through hole 391b of the unit plate 390-1 being located at the lower-most position of the latent-heat exchange unit 300-2, passes the through hole 311 formed at the unit plate 310 being located at the upper-most position thereof via each of the second heating medium passages P3 of the unit plates being located from a lower position to an upper position of the latent-heat exchange unit 300-2, and then moves to the upper side of the first heating medium passage P1 of the sensible-heat exchange unit 300-1 through a through hole 312 formed at the unit plate 310 according to a switching of a passage by the passage connecting portion E.

In this case, the heating medium may flow in and out the second heating medium passage P3 formed inside the latent-heat exchange unit 300-2 through the through holes being formed diagonally opposite to each other to flow in both directions, and thus the flow channel of the heating medium may be formed to be long so that collection efficiency of latent heat may be increased.

Next, one embodiment of a flow channel of a heating medium in the sensible-heat exchange unit 300-1 will be described.

The present disclosure is configured such that a heating medium, which flowed in a through hole formed at one side of a first plate configuring a unit plate being located at an upper side among unit plates that are longitudinally located to be adjacent to each other, is branched off to both directions to flow along the first heating medium passage P1, and then passes a through hole formed at a second plate being located at an opposite side against the first plate and a through hole formed at a first plate configuring a unit plate being located at a lower side thereamong, thereby flowing in a first heating medium passage P1 of the unit plate being located at the lower side.

In a configuration for the purpose of implementing the described above, the first passage forming protruding portion D1 is formed to be entirely communicated along a circumferential direction of the first plate, the first passage forming depressed portion D2 is formed to be entirely communicated along a circumferential direction of the second plate, and a through hole is formed at the first gap maintaining protruding portion E1 and the first gap maintaining depressed portion E2 so as to connect a first heating medium passage P1 of a unit plate located at the upper side to that of a unit plate located at the lower side, wherein the through hole is located so as to reverse a direction of the first heating medium passage P1 at the unit plate located at the upper side against that of the first heating medium passage P1 at the unit plate located at the lower side.

Figure 4:
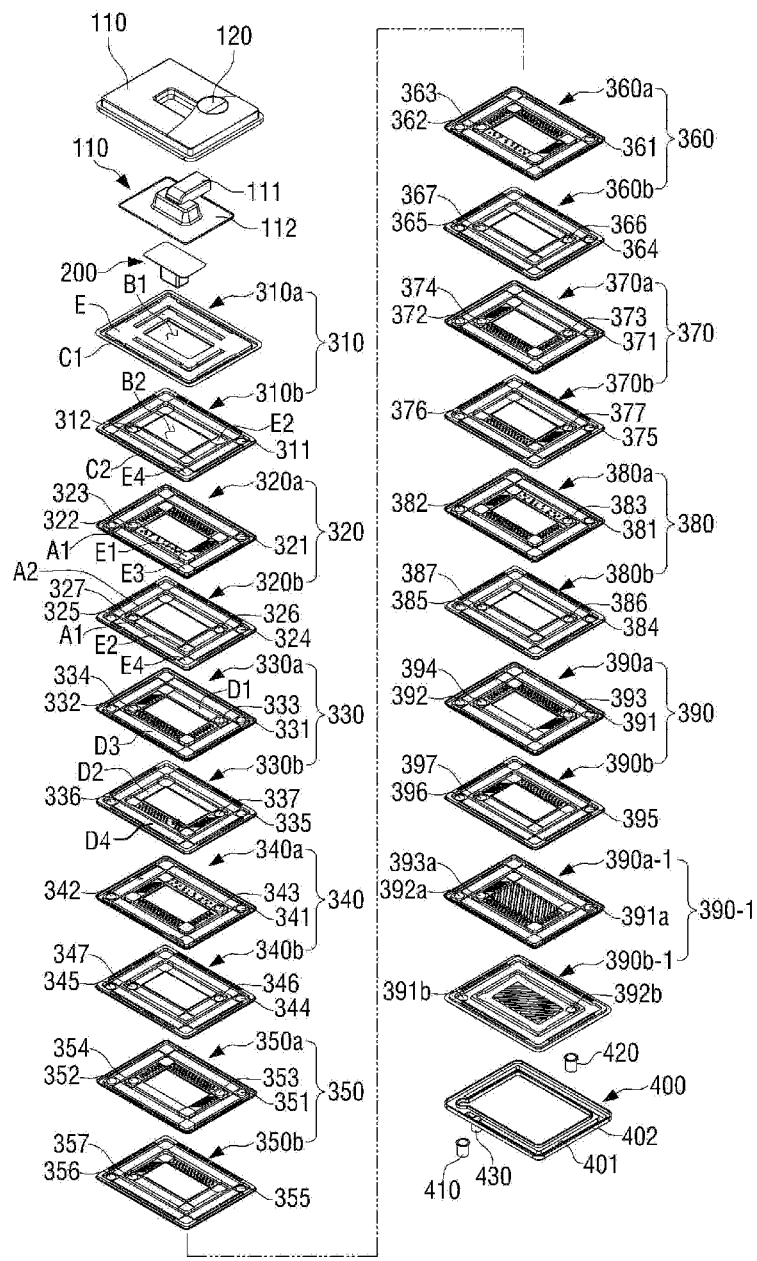
FIG. 4 is an exploded perspective view of the heat exchanger according to one embodiment of the present disclosure.
Figure 5:
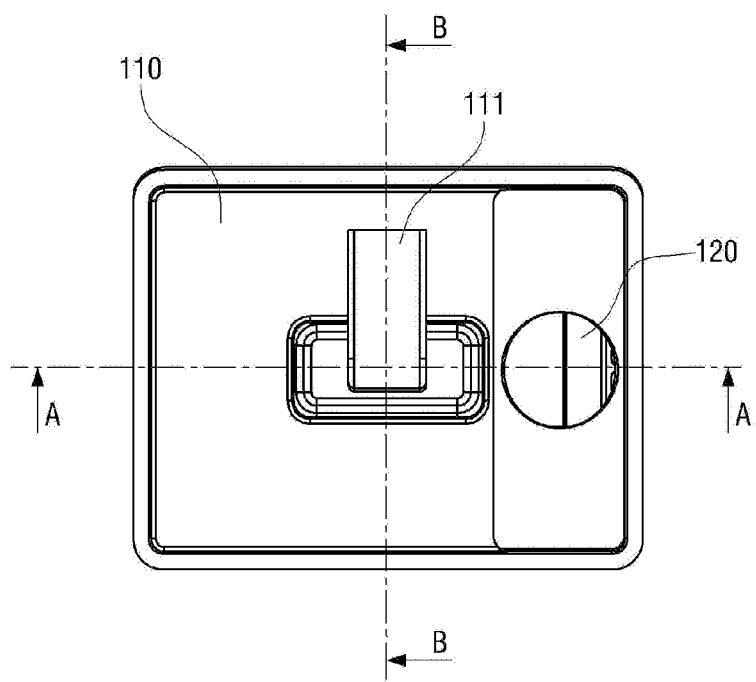
FIG. 5 is a plan view of the heat exchanger according to one embodiment of the present disclosure.
Figure 6:
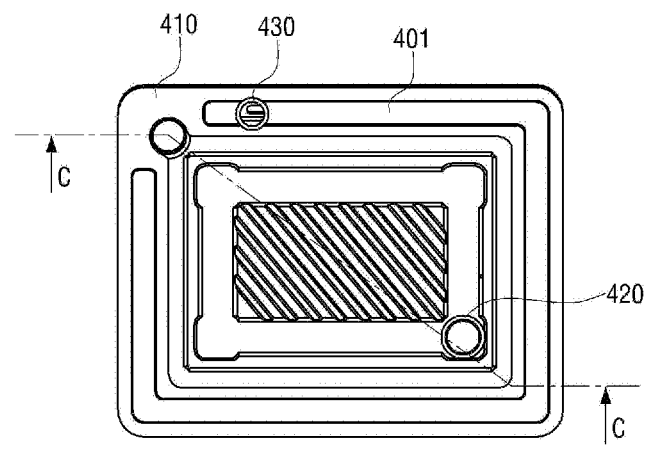
FIG. 6 is a bottom view of the heat exchanger according to one embodiment of the present disclosure.
Figure 6:
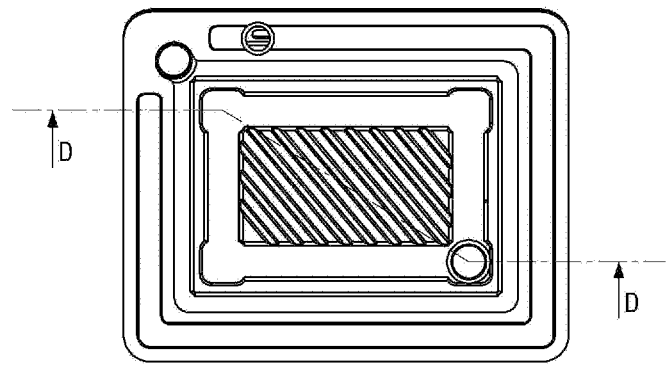
Figure 12:
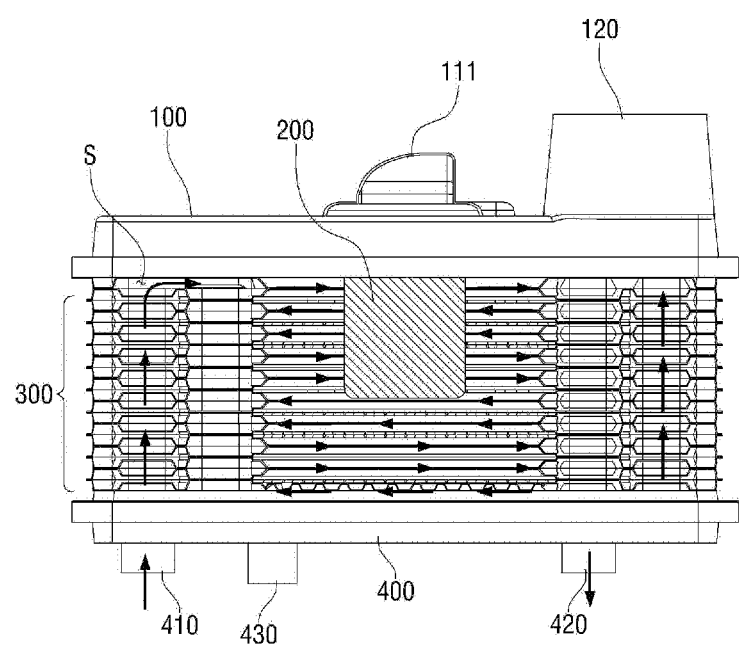
FIG. 12 is a cross-sectional view taken along line D-D of FIG. 6.
Figure 13:
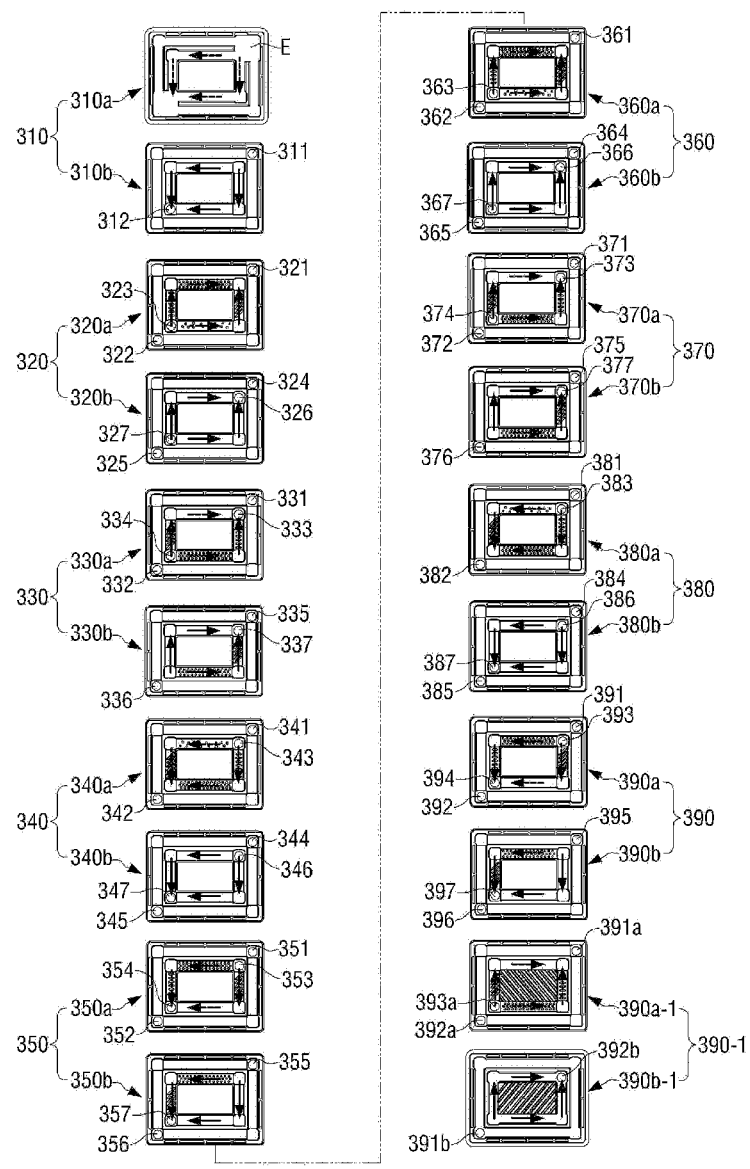
FIG. 13 is a diagram for describing a flow channel of a heating medium at the heat exchanger according to one embodiment of the present disclosure.

Hereinafter, a flow channel of a heating medium in the sensible-heat exchange unit 300-1 will be described in more detail with reference to FIGS. 4, 12, and 13.

A heating medium, which flowed in first heating medium passages P1 inside unit plates 320 and 330 being located at a lower side through a through hole 312 of a unit plate 310 located at an upper-most position and through holes 323, 327, and 334 located below the through hole 312, flows in an arrow direction toward through holes 326, 333, and 337 being located diagonally opposite the through holes 323, 327, and 334.

And, the heating medium, which flowed in first heating medium passages P1 inside unit plates 340 and 350 being located at the lower side through the through hole 337 of the unit plate 330 and through holes 343, 346, and 353 being located below the through hole 337, flows toward through holes 347, 354, and 357 being located diagonally opposite the through holes 343, 346, and 353.

Thereafter, the heating medium, which flowed in first heating medium passages P1 inside unit plates 360 and 370 being located at the lower side through the through hole 357 of the unit plate 350 and through holes 363, 367, and 374 being located below the through hole 357, flows toward through holes 326, 373, and 377 being located diagonally opposite the through holes 363, 367, and 374.

Afterward, the heating medium, which flowed in first heating medium passages P1 inside unit plates 380 and 390 being located at the lower side through the through hole 377 of the unit plate 370 and through holes 383, 386, and 393 being located below the through hole 377, flows toward through holes 387, 394, and 397 being located diagonally opposite the through holes 383, 386, and 393.

And then, the heating medium, flowed inside a unit plate 390-1 through the through hole 397 of the unit plate 390 and a through hole 393a being located below the through hole 397, is discharged to the heating medium discharge pipe 420 through a through hole 392b being located diagonally opposite the through hole 393a.

As described above, in the sensible-heat exchange unit 300-1, the passage of the heating medium may be alternately changed in a direction from a lower left end to an upper right end and vice versa in the unit plates being located at the upper and lower sides, respectively. Consequently, the passage of the heating medium may be formed to be long so that heat transfer efficiency between the combustion gas and the heating medium may be increased.

Figure 14:
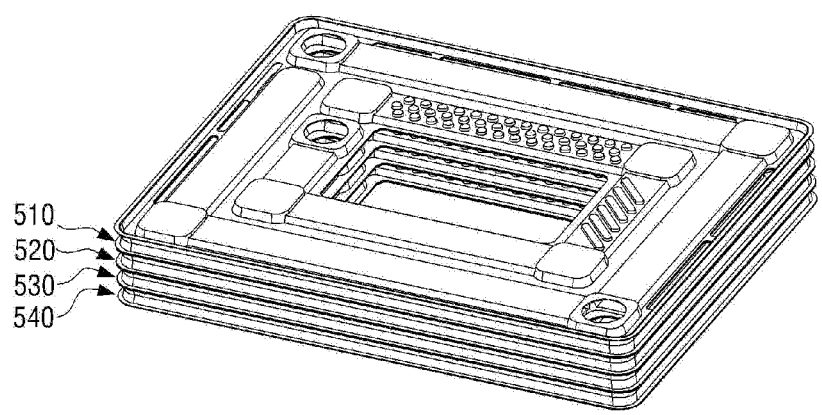
FIG. 14 is a perspective view of a stacked structure of a unit plate according to another embodiment of the present disclosure.

Hereinafter, another embodiment of a flow channel of a heating medium will be described with reference to FIGS. 14 to 16. Unit plates 510, 520, 530, and 540 according to the present embodiment may replace the above described unit plates configuring the heat exchange unit 300 described above, and therefore, a structure of each of the unit plates 510, 520, 530, and 540 configuring a single set and a flow channel of a heating medium inside the structure thereof will be described below.

A flow channel of a heating medium according to the present embodiment is configured such that the heating medium, which flowed in through a through hole formed at one side of a first plate configuring a unit plate being located at an upper side among unit plates being longitudinally located to be adjacent to each other, flows in one direction along the first heating medium passage P1, and then passes a through hole formed at a second plate being located at an opposite side against the first plate and a through hole formed at a first plate configuring a unit plate located at a lower side thereamong to flow in a first heating medium passage P1 of the unit plate located at the lower side.

In a configuration for the purpose of implementing the described above, the first passage forming protruding portion D1 is formed to be partially communicated along a circumferential direction of the first plate, the first passage forming depressed portion D2 is formed to be partially communicated along a circumferential direction of the second plate, and a through hole is formed at the first gap maintaining protruding portion E1 and the first gap maintaining depressed portion E2 so as to connect a first heating medium passage P1 of a unit plate being located at the upper side to that of a unit plate being located at the lower side, wherein the through hole is located so as to reverse a direction of the first heating medium passage P1 at the unit plate being located at the upper side against that of the first heating medium passage P1 at the unit plate being located at the lower side.

Figure 15:
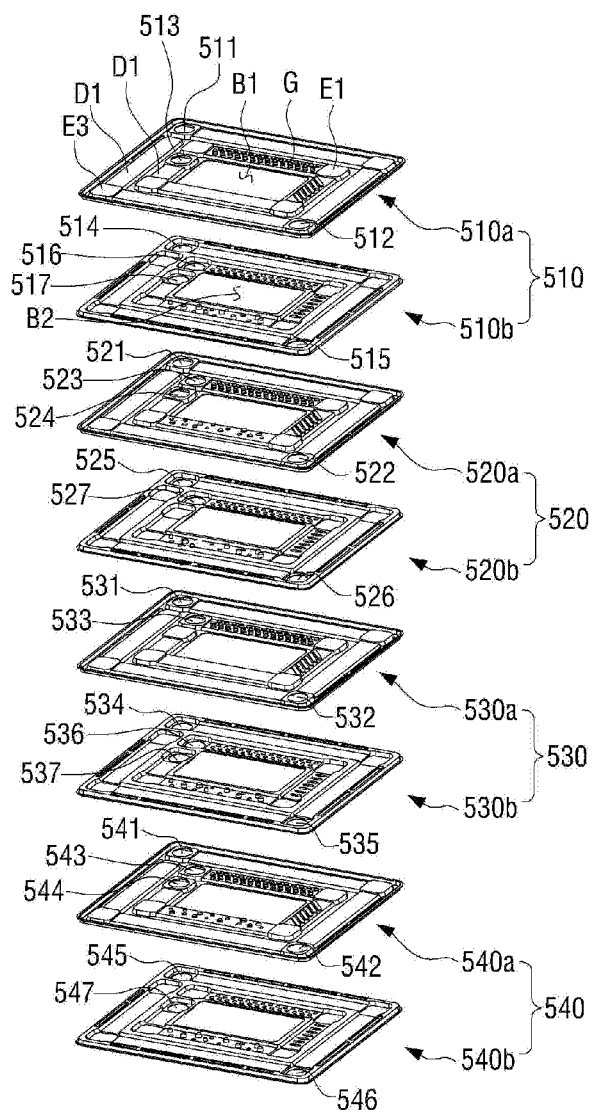
FIG. 15 is an exploded perspective view of FIG. 14.
Figure 16:
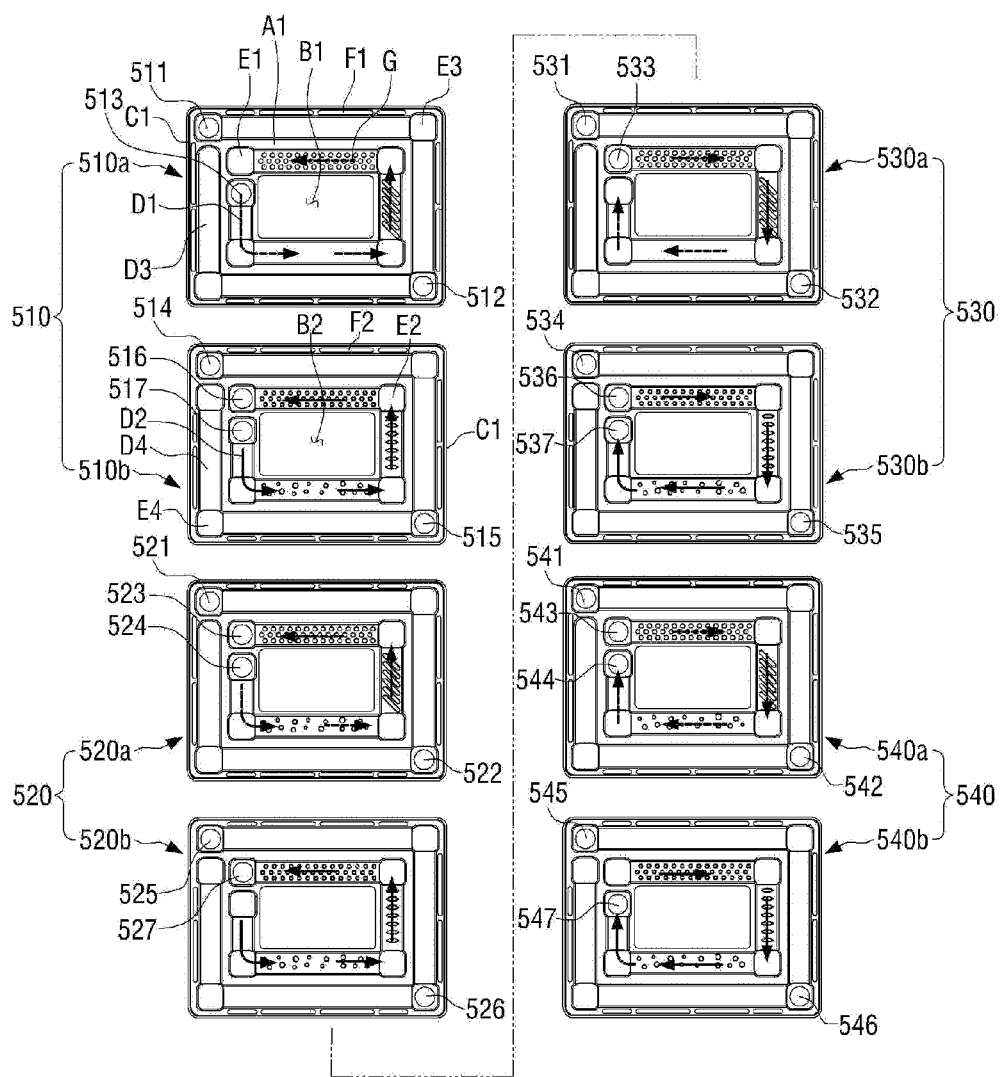
FIG. 16 is a diagram for describing a flow channel of a heating medium at the unit plate shown in FIG. 14.

With reference to FIGS. 15 and 16, a latent-heat exchange unit has a structure similar to that of the above described implementation, and through holes 511, 512, 514, 515, 521, 522, 525, 526, 531, 532, 534, 535, 541, 542, 545, and 546, some of which longitudinally correspond to each other, are formed at a second gap maintaining protruding portion E3 and a second gap maintaining depressed portion E4, which are located diagonally opposite to each other, of first plates 510a, 520a, 530a, and 540a and second plates 510b, 520b, 530b, and 540b of the unit plates 510, 520, 530, and 540. Therefore, a heating medium may flow in and out a second heating medium passage P3 formed inside the latent-heat exchange unit through the through holes being formed diagonally opposite to each other to flow in both directions, and thus a flow channel of the heating medium may be formed to be long so that collection efficiency of latent heat may be increased.

Next, a flow channel of a heating medium in a sensible-heat exchange unit will be described.

A heating medium, which flowed in a first heating medium passage P1 through a through hole 513 of the unit plate 510 being located at an upper side, flows in a counterclockwise direction when viewed from the top plane to a through hole 517, and then flows in a first heating medium passage P1 of the unit plate 520 through a through hole 516 and a through hole 524 being located therebelow.

The heating medium, which flowed in the first heating medium passage P1 of the unit plate 520, flows in a counterclockwise direction when viewed from the top plane to a through hole 533 of the unit plate 530 being located below the unit plate 520, and then flows in a first heating medium passage P1 of the unit plate 530 through the through hole 533.

The heating medium, which flowed in the first heating medium passage P1 of the unit plate 530, flows in a clockwise direction toward a through hole 543 of the unit plate 540 being located below the unit plate 530, and then flows in the unit plate 540 through the through hole 543. Similarly, the heating medium also flows in the clockwise direction inside the unit plate 540.

In the present embodiment as described above, a flow direction of the heating medium may be configured to alternately change from the counterclockwise direction to the clockwise direction and vice versa in one unit plate being placed at the upper side and the other unit plate being located below the one unit plate being placed at the upper side, and thus the passage of the heating medium may be formed to be long so that thermal efficiency may be increased.

The unit plates 510, 520, 530, and 540 exemplified and described in the present embodiment may be stacked in a plurality of unit sets to configure the heat exchange unit 300.

Figure 17:
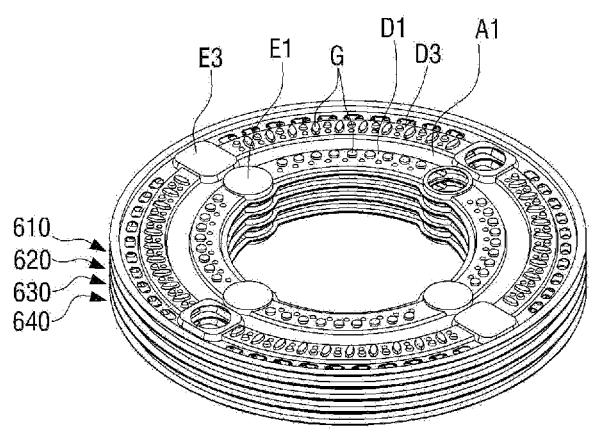
FIG. 17 is a perspective view of a stacked structure of a unit plate according to still another embodiment of the present disclosure.

Although the above described embodiments have exemplified the unit plates which configure the heat exchange unit 300 and are formed to surround the burner 200 in a quadrangular shape, the unit plates may be configured in a polygonal shape including a pentagonal shape and the like in addition to the quadrangular shape, and an oval shape. Further, as shown in FIG. 17, unit plates 610, 620, 630, and 640 may be arranged and configured in a circular shape. The flow channels of the heating medium and the combustion gas in the unit plates 610, 620, 630, and 640 shown in FIG. 17 may be applicable the same as those of the above described embodiments, and thus a description thereof will be omitted.

Figure 18A:
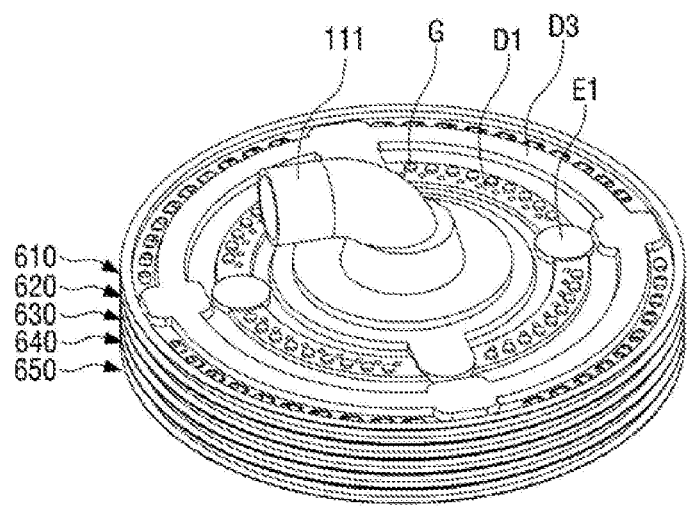
FIGS. 18A and 18B are a perspective view and a partially dissected perspective view of an embodiment in which a passage of a heating medium is additionally formed at an upper part of a burner, respectively.
Figure 18B:
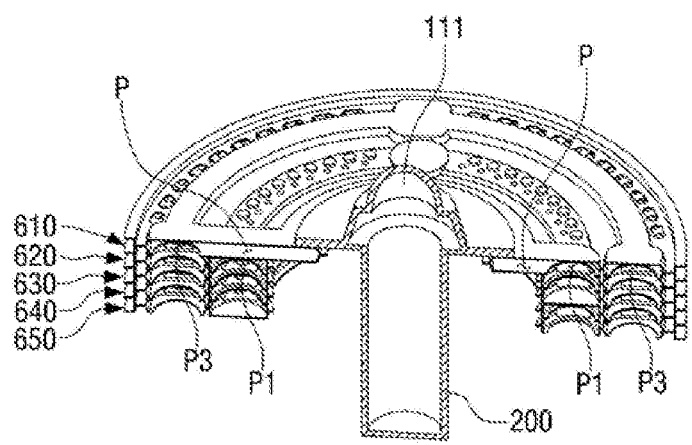

Meanwhile, as shown in FIG. 18, a heating medium connecting passage P may be additionally formed and configured at a lateral circumferential surface of an upper part of the burner 200, wherein the heating medium connecting passage P is connected to the first heating medium passage P1 being located at the upper part, thereby allowing a heating medium to pass the heating medium connecting passage P.

With a configuration of the heating medium connecting passage P, it may prevent a burner supporting plate from being overheated by combustion heat transferred through the upper part of the burner 200, and the combustion heat of combustion gas may be absorbed by the heating medium passing the heating medium connecting passage P such that insulation and thermal efficiency may be more improved.

As described above, the present disclosure is not limited to the described embodiments, and it should be construed that modifications can be apparently devised by those skilled in the art without departing from the technical spirit of this disclosure defined by the appended claims, and also such modifications will fall within the scope of this disclosure.

The invention claimed is:

1. A heat exchanger comprising:
a burner configured to burn a mixture of air and fuel; and
a heat exchange unit configured to exchange heat between combustion gas generated by combustion of the burner and a heating medium,
wherein the heat exchange unit is formed by a plurality of stacked unit plates,
wherein the heat exchange unit comprises a sensible-heat exchange unit and a latent-heat exchange unit, the sensible-heat exchange unit and the latent-heat exchange unit being integrally formed by the plurality of stacked unit plates and arranged around a periphery of the burner in a coaxial structure such that the sensible-heat exchange unit is part of the stacked unit plates and is located at an inner region of each of the plurality of stacked unit plates, and the latent-heat exchange unit is part of the stacked unit plates and is integrally formed with the sensible-heat exchange unit at an outer region of each of the plurality of stacked unit plates,
wherein a first heating medium passage and a first combustion gas passage are separately and alternately formed adjacent to each other through the entirety of the stacked unit plates of the sensible-heat exchange unit, a second heating medium passage and a second combustion gas passage are separately and alternately formed adjacent to each other through the entirety of the stacked unit plates of the latent-heat exchange unit, and a combustion gas discharge passage is formed at an edge of each of the plurality of unit plates to discharge combustion gas that has passed through the first combustion gas passage and the second combustion gas passage,
wherein, in the plurality of stacked unit plates, a flow direction of the heating medium passing through the first heating medium passage of a first unit plate of the plurality of stacked unit plates and a flow direction of the heating medium passing through the first heating medium passage of a second unit plate adjacent to the first unit plate of the plurality of stacked unit plates are opposite to each other, and
wherein each respective flow direction extends entirely from an inlet to an outlet of the respective heating medium passage.

2. The heat exchanger of claim 1, wherein each of the plurality of unit plates is formed with a first plate and a second plate which are longitudinally stacked, wherein the first plate includes:
a first plane portion in which a first through hole is formed at a central part thereof;
a first flange portion formed to extend from an edge of the first plane portion to an upper side thereof and bent to an outward side thereof; and
a protruding portion of the first heating medium passage and a protruding portion of the second heating medium passage that are spaced apart from each other at a region between the edge of the first plane portion and the first through hole, wherein the protruding portion of the first heating medium passage and the protruding portion of the second heating medium passage have an upwardly convex shape, and
wherein the second plate includes:
a second plane portion in which a second through hole of a shape matching that of the first through hole is formed at a central part of the second plane portion and having an upper surface in contact with a bottom surface of the first plane portion;
a second flange portion that extends from an edge of the second plane portion to a lower side thereof and bent to an outward side; and
a depressed portion of the first heating medium passage and a depressed portion of the second heating medium passage that are spaced apart from each other at a region between the edge of the second plane portion and the second through hole and having a downwardly concave shape,
wherein the first heating medium passage is formed between the protruding portion of the first heating medium passage and the depressed portion of the first heating medium passage, and the second heating medium passage is formed between the protruding portion of the second heating medium passage and the depressed portion of the second heating medium passage.

3. The heat exchanger of claim 2, wherein the first flange portion is higher than a protruding height of each of the protruding portion of the first heating medium passage and the protruding portion of the second heating medium passage, the second flange portion is deeper than a depressed depth of each of the depressed portion of the first heating medium passage and the depressed portion of the second heating medium passage, and the plurality of unit plates are arranged side by side.

4. The heat exchanger of claim 3, wherein a plurality of first gap maintaining protruding portions protrude at the same height as that of the first flange portion at the protruding portion of the first heating medium passage, a plurality of second gap maintaining protruding portions protrude at the same height as that of the first flange portion at the protruding portion of the second heating medium passage, a plurality of first gap maintaining depressed portions are depressed at the same depth as that of the second flange portion at the depressed portion of the first heating medium passage, and a plurality of second gap maintaining depressed portions are depressed at the same depth as that of the second flange portion at the depressed portion of the second heating medium passage.

5. The heat exchanger of claim 3, wherein a first combustion gas outlet is formed at the edge of the first plane portion to provide the combustion gas discharge passage, and a second combustion gas outlet is formed at a position on the edge of the second plane portion, wherein the position longitudinally aligns with the first combustion gas outlet.

6. The heat exchanger of claim 3, wherein a turbulent flow portion is formed at the protruding portion of the first heating medium passage, the depressed portion of the first heating medium passage, the protruding portion of the second heating medium passage, and the depressed portion of the second heating medium passage.

7. The heat exchanger of claim 4, wherein the protruding portion of the first heating medium passage is arranged along a circumferential direction of the first plate, the depressed portion of the first heating medium passage is arranged along a circumferential direction of the second plate, and a through hole is formed at the first gap maintaining protruding portion and the first gap maintaining depressed portion,
  wherein the through hole is located to reverse a direction of the first heating medium passage in the unit plate being located at the upper side against that of the first heating medium passage in the unit plate being located at the lower side.

8. The heat exchanger of claim 4, wherein a through hole is formed at the first gap maintaining protruding portion and the first gap maintaining depressed portion so as to connect a first heating medium passage of a first unit plate located at an upper side of the stacked unit plates to a first heating medium passage of a second unit plate located at a lower side of the stacked unit plates,
  wherein the through hole is located so as to reverse a direction of the first heating medium passage in the first unit plate located at the upper side against that of the first heating medium passage of the second unit plate located at the lower side.

9. The heat exchanger of claim 8, wherein a heating medium, which flowed in through a through hole formed at one side of a first plate configuring the first unit plate located at the upper side, flows in one direction along the first heating medium passage of the first unit plate, and then passes through a through hole formed at a second plate located at an opposite side against the first plate and a through hole formed at a first plate configuring the second unit plate, therebyflowing in a first heating medium passage of the second unit plate located at the lower side.

10. The heat exchanger of claim 1, wherein multiple first heating medium passages are configured in parallel with each other in the plurality of stacked unit plates.

11. The heat exchanger of claim 1, wherein a heating medium inflow pipe is connected to a lower part of the latent-heat exchange unit, wherein a heating medium flows in the second heating medium passage, wherein a passage connecting portion is provided at an upper part of each of the latent-heat exchange unit and the sensible-heat exchange unit and is fluidly connected with an upper part of the second heating medium passage and an upper part of the first heating medium passage, thereby guiding a heating medium passed the second heating medium passage to flow in the first heating medium passage, and wherein a heating medium discharge pipe is connected to a lower part of the sensible-heat exchange unit to discharge the heating medium that has passed through the first heating medium passage.

12. The heat exchanger of claim 1, wherein an upper duct is provided at an upper part of the heat exchange unit, wherein combustion gas passing the combustion gas discharge passage and flowing upward is discharged through the upper duct, and a lower duct is provided at a lower part of the heat exchange unit, wherein a condensed water guide portion is formed at the lower duct to guide condensed water of water vapor, which is contained in the combustion gas passing the combustion gas discharge passage, to a condensed water discharge pipe.

13. The heat exchanger of claim 1, wherein at least one of the plurality of stacked unit plates is arranged to surround the circumference of the burner in a polygonal shape, a circular shape, or an oval shape.

14. The heat exchanger of claim 1, wherein a heating medium connecting passage is formed at a lateral circumferential surface of an upper part of the burner, wherein the heating medium connecting passage is connected to a first heating medium passage located at the upper part of the burner, thereby allowing the heating medium to pass through the heating medium connecting passage.

* * * * *